United States Patent [19]

Paige

[11] Patent Number: 4,810,136

[45] Date of Patent: Mar. 7, 1989

[54] MILLING CUTTER FOR COMPOSITE LAMINATES

[75] Inventor: Richard W. Paige, Snohomish, Wash.

[73] Assignee: The Boeing Company, Seattle, Wash.

[21] Appl. No.: 550,141

[22] Filed: Nov. 9, 1983

[51] Int. Cl.$^4$ ............................................. B26D 1/143
[52] U.S. Cl. ........................................ 407/54; 407/59; 407/63
[58] Field of Search ......................... 407/53, 54, 59, 63

[56] References Cited

U.S. PATENT DOCUMENTS

| | | | |
|---|---|---|---|
| 1,328,430 | 1/1920 | Hathaway | 457/59 |
| 2,855,657 | 10/1958 | Erhardt | 407/59 |
| 3,736,634 | 6/1973 | Sonnie | 407/59 |
| 3,863,316 | 2/1975 | Yeo | 407/54 |
| 4,227,837 | 10/1980 | Yodoshi | 407/63 |
| 4,285,618 | 8/1981 | Shanley | 407/54 |

FOREIGN PATENT DOCUMENTS

| | | | |
|---|---|---|---|
| 771631 | 10/1934 | France | 407/54 |
| 625848 | 9/1978 | U.S.S.R. | 407/63 |

*Primary Examiner*—Fred A. Silverberg
*Attorney, Agent, or Firm*—James P. Hamley; B. A. Donahue

[57] ABSTRACT

A spiral four fluted rotary carbide cutter has a one directional helix throughout much of its length, and a reverse directional helix adjacent the cutting end. Opposite lands, between the flutes, have square cornered axially aligned and equally spaced notches; with adjacent lands having the notches intermediately located with respect to each other. All of the notches are at an angle of about 20 degrees with respect to a line perpendicular to the axis of the cutter to in combination provide a cutter for Kevlar containing composite panels.

6 Claims, 1 Drawing Sheet

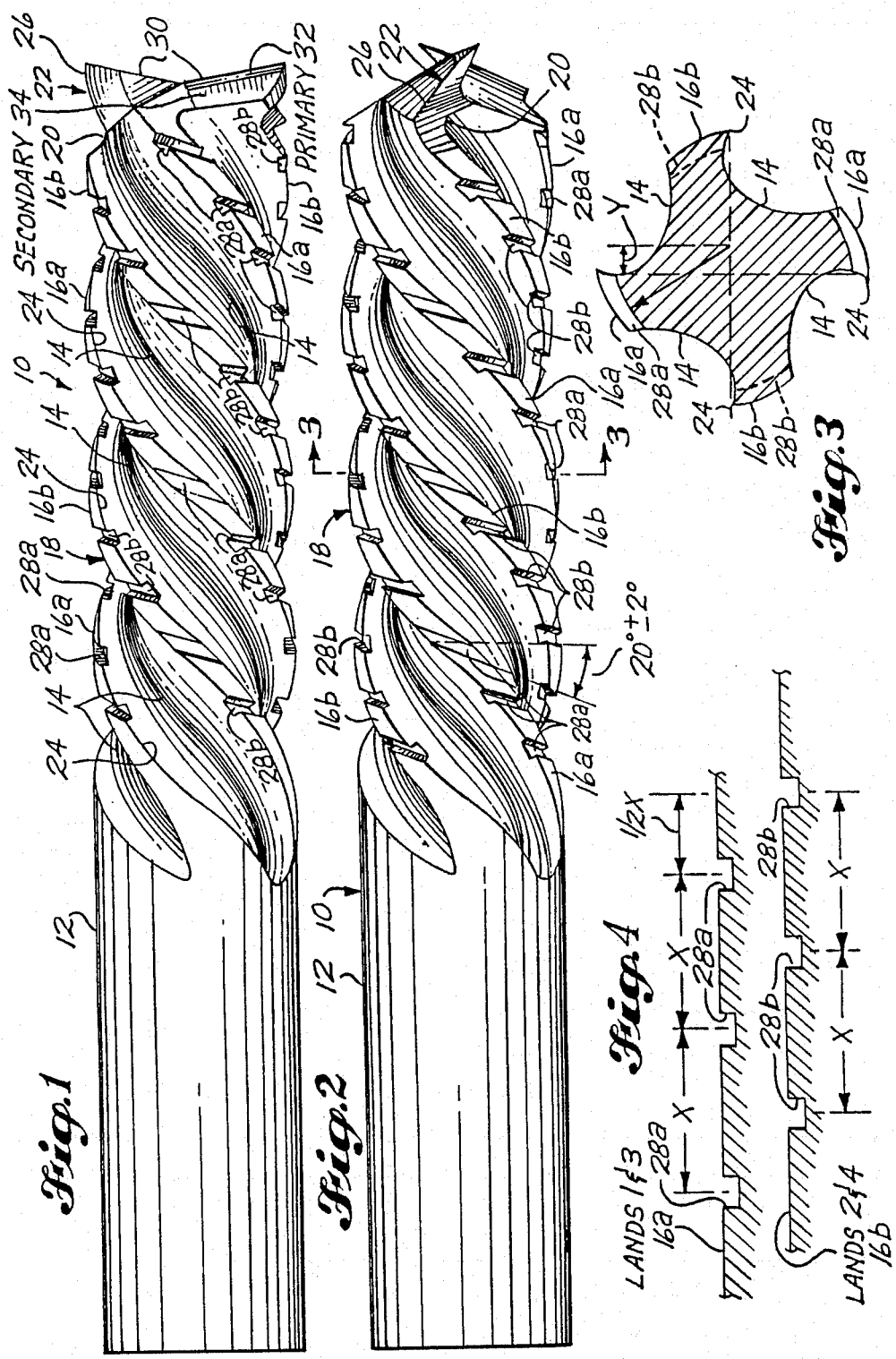

MILLING CUTTER FOR COMPOSITE LAMINATES

BACKGROUND OF THE INVENTION

Composite structures are rapidly increasing in use throughout industry. The fibers used for reinforcing in these structures often give difficulty during machining as the cutting edge of the working tool tends to fray instead of cutting the fibers. This is particularly true of Kevlar, which is the trade name for an aramid fiber. These frayed fibers must be removed by grinding, sanding, filing etc., by hand; which is time consuming. A milling cutter was developed which gives a sharp cut to Kevlar composite structural laminates, does not leave frayed fibers, and may be operated at desirable operating speeds without overheating.

SUMMARY OF THE INVENTION

A rotary cutting tool has four spiral flutes, and both a right hand and a left hand helix to cut toward and away from the tool tip. Chip breakers are arranged along the lands with the notches in alternate lands aligned and the notches of the other lands intermediately aligned. The notches are cut at an angle of about 20 degrees from a line perpendicular to the axis of the cutting tool.

It is an object of this invention to provide a rotary cutter with angled chip breakers to cleanly cut composite Kevlar reinforced panels.

It is another object of this invention to provide a rotary cutter for composite Kevlar reinforced panels that may be operated at desireable production speeds without overheating.

DESCRIPTION OF THE DRAWINGS

FIG. 1 shows a side view of the cutter of this invention.

FIG. 2 shows a side view as in FIG. 1, but with the cutter rotated 90 degrees.

FIG. 3 is a cross-sectional view taken along line 3—3 of FIG. 2.

FIG. 4 is a fragmented schematic view showing the relationship of the notches.

DETAILED DESCRIPTION

A trim cutter 10 for a Kevlar containing composite structure is preferably made of a carbide material. The cutter has a cylindrical shank 12, four spirally shaped flutes 14, and adjoining lands 16. The flutes with lands have a one directional helix 18, from the shank to a point 20, near the end of the cutter. Beyond that point, the flutes and lands change to an opposite direction helix 22; so that even though the cutter rotates in one direction it has both a right hand a left hand helix. The helix 18, has cutting edges 24, and the opposite directional helix 22, has cutting edges 26.

The lands 16, as best shown in FIG. 3, are paired in two alternate sets 16a and 16b. There are a series of equally spaced apart square cornered notches 28, located along the lands. These notches are also set up in pairs, with notches 28a located in lands 16a and notches 28b located in lands 16b. The notches in each pair are arranged to be equal distant in an axial direction with the notches in one pair located intermediate with respect to the notches in the other pair. See FIG. 4, where it shows lands 1 and 3, which are both marked 16a, have square cornered notches 28a, axially aligned and uniformly spaced apart a distance X; and lands 2 and 4; which are both marked 16b, have square cornered notches 28b, uniformly spaced apart a distance X, but the notches of 28a and 28b are offset from each other by a distance ½ X. All of the notches are aligned at an angle of about 20°+2° with respect to a line perpendicular with the axis, see FIG. 2. The width of each notch is preferably slightly less than the width between notches. The bottom of each notch preferably lies on a radius having its center offset a distance Y from the milling cutter axis, as shown in FIG. 3, to provide relief as the cutter moves through the composite.

The end of the cutter is shaped like a milling cutter with end cutting edges 30, tapered inwardly, and having a primary bevelled surface 32, and a secondary bevelled surface 34.

I claim:

1. A milling cutter for aramid reinforced composite structures comprising:
   a rotary cutter having four spirally shaped flutes, said flutes being formed of a first reference twist up to a point proximate to the end of said cutter, at which point said flutes are formed in a second twist opposite to said first twist, said flutes having adjoining lands with said lands being provided with a series of axially spaced, substantially square cornered notches with each notch being predeterminedly angled from perpendicular with respect to the longitudinal axis of the cutter, said notches formed on alternate lands being axially aligned with one another and the notches on adjacent lands being axially staggered with one another, said lands having provided cutting edges, and the tip of said flutes at the end of said cutter being formed with predeterminedly bevelled cutting edges.

2. A milling cutter for aramid reinforced composites as in claim 1, wherein the axial distance between each adjacent notch in each land is slightly greater than the width of the notch.

3. A milling cutter for aramid reinforced composite structures as in claim 2 wherein the bottom of each notch lies on a radius having its center offset from the milling cutter axis to provide relief as the cutter moves through the composite.

4. A milling cutter for aramid reinforced composite structures as in claim 1 wherein the bottom of each notch lies on a radius having its center offset from the milling cutter axis to provide relief as the cutter moves through the composite.

5. A milling cutter for aramid reinforced composites as in claim 1, wherein the axis of each of said notches is aligned at angle of approximately 20 degrees from perpendicular with respect to the longitudinal axis of the cutter.

6. A milling cutter for aramid reinforced composites as in claim 1, formed of a carbide material.

* * * * *